Patented Sept. 14, 1943

2,329,394

UNITED STATES PATENT OFFICE 2,329,394

CERTAIN WATER-SOLUBLE HIGH MOLAL OXYALKYLATED ESTERS AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application March 21, 1941, Serial No. 384,595. Divided and this application June 26, 1942, Serial No. 448,682

12 Claims. (Cl. 260—404.8)

This invention relates to a new chemical product or compound, our present application being a division of our co-pending application Serial No. 384,595, filed March 21, 1941, now U. S. Patent No. 2,295,164, dated September 8, 1942.

One object of our present invention is to provide a new material, compound or composition of matter, that is capable of use for various purposes, and particularly adapted for use as a demulsifier in the resolution of crude oil emulsions.

Another object of our invention is to provide a practicable method for manufacturing said new material, compound or composition of matter.

The new chemical compound or composition of matter which constitutes our present invention is exemplified by acidic, or preferably, the neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material indicated, for the sake of convenience, by the formula T.OH, is reacted with a polybasic carboxy acid, which, similarly, may conveniently be indicated as being of the dibasic type, by the formula

HOOC.D.COOH then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience, these polyethylene glycols may be indicated by the following formula:

OH(C₂H₄O)ₘH 

in which $m$ varies from 7 through 17.

Instead of polyethylene glycols, one may use polypropylene glycols, or polybutylene glycols. Thus, for convenience, in the broadest aspect, the polyalkylene glycols employed may be indicated by the following formula:

OH(CₙH₂ₙO)ₘH 

in which $m$ has its previous significance and $n$ represents a numeral varying from 2 to 4.

Thus, the bulk of the materials herein contemplated, particularly for use as demulsifiers, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

T.OOC.D.COOH+OH(C₂H₄O)ₘH+HOOC.D.COO.T ⟶
T.OOC.D.COO(C₂H₄O)ₘ₋₁C₂H₄.OOC.D.COO.T 

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8-12 oxyalkylene groups, particularly 8-12 oxyethylene groups. The preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly, minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradeca-ethylene glycol. As is well understood, the method of producing such glycols would cause some higher homologs to be formed; and thus, even in this instance there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol, or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intremediate product may then be considered as a dibasic or polybasic acid. One mole of the intermediate, so obtained, is then reacted with two moles of the alcholic material of the kind subsequently described.

It is to be noted, however, that if one prepares a fractional acidic ester, then, if two moles of the fractional acidic ester are reacted with one mole of the polyethylene glycol, there is no possibility for the formation of polymeric types of esterification products under ordinary conditions.

The alcoholic compounds employed as reactants in the manufacture of the present compounds, are materials commonly referred to as high molal alcohol acids, or high molal hydroxy acids. They are invariably water-insoluble. The commonest example is ricinoleic acid. Other hydroxy fatty acids include hydroxystearic acid, dihydroxystearic acid, diricinoleic acid, aleuritic acid, and the like. Similar acids are obtained in the oxidation of paraffin, petroleum hydrocarbon, or wax, and are commonly referred to as hydroxylated wax acids. Hydroxylated wax acids occur as by-products in the oxidation of waxes or similar materials, and are usually separated so that the commonest commercial form of oxidized wax acids represent mixtures comparatively free from the hydroxylated compounds. Hydroxylated acids are produced by other procedures, such as chlorination, either by addition or substitution, as, for example, chlorination of oleic acid or stearic acid. Subsequent reactions involve the removal of the chlorine with the introduction of a hydroxyl radical. Undecylenic acid, derived from castor oil, has been converted into a hydroxy undecenoic acid. Unsaturated hydroxy acids, such as ricinoleic acid, may be treated in various manners, so as to produce derivatives, for example, chlorinated or brominated ricinoleic acid. Such materials are entirely satisfactory for use as reactants in the preparation of materials of the kind herein contemplated. Naturally-occurring naphthenic acids can also be converted into hydroxylated products by following similar procedure. An unsaturated hydroxy acid, such as ricinoleic acid, can be converted into a hydroxylated arylstearic acid. Such procedure contemplates reactions such as those involving ricinoleic acid, benzene, and aluminum chloride in large excess, or involves the desulfonation of a sulfo-aromatic fatty acid. In any event, by employing derivatives of undecylenic acid, or one or more of the various wax acids, naturally-occurring naphthenic acid, ricinoleic acid, diricinoleic acid, or derivatives thereof, as have been enumerated, one can obtain a variety of hydroxylated monocarboxy acids, having at least 11 carbon atoms and not in excess of 36 carbon atoms. Such compounds are the kind herein contemplated as reactants to furnish the alcoholiform hydroxyl.

Hydroxy acids of the kind herein contemplated may also be prepared by the hydrolysis of alpha-halogen acids. For instance, alpha-bromocaproic acid, alpha-bromocaprylic acid, alpha-bromocapric acid, alpha-bromolauric acid, alpha-bromomyristic acid, alpha-bromopalmitic acid, and the like, can be hydrolyzed to give the corresponding alpha-hydroxy acid. Indeed, a reactive alpha-halogen acid may serve as a functional equivalent of an alpha-hydroxy acid by liberation of hydrochloric acid, instead of water. Such type of reaction, however, involves numerous difficulties; and thus, it is better to employ a hydroxy acid.

In some instances derivatives of hydroxylated unsaturated acids are most readily obtained by the employment of an intermediate in which the hydroxyl group is protected. Thus, ricinoleic acid may be acetylated, and such acetyl ricinoleic acid converted into a derivative, for instance, a derivative in which an aryl group is introduced. Such derivative can then be saponified or hydrolyzed so as to regenerate the hydroxyl radical.

*Acidic intermediate product, Example 1*

One pound mole of nonaethylene glycol is reacted with two pound moles of maleic anhydride, as as to form nonaethylene glycol dihydrogen dimaleate.

Acidic intermediate product, Example 2

A mixture of lower non-distillable polyethylene glycols, representing approximately deca- to tetradeca-ethylene glycol, is substituted for nonaethylene glycol in the preceding example.

Acidic intermediate product, Example 3

A 50-50 mixture of nonaethylene glycol and lower non-distillable polyethylene glycols of the kind described in the previous example is substituted for nonaethylene glycol in Example 1.

Acidic intermediate product, Example 4

Adipic acid is substituted for maleic anhydride in Examples 1-3, preceding.

Acidic intermediate product, Example 5

Oxalic acid is substituted for maleic anhydride in Examples 1-3, preceding.

Acidic intermediate product, Example 6

Citric acid is substituted for maleic anhydride in Examples 1-3, preceding.

Acidic intermediate product, Example 7

Succinic anhydride is substituted for maleic anhydride in Examples 1-3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent, that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

Composition of matter, Example 1

One pound mole of the intermediate product of the kind described in Intermediate product, Examples 1, 2 and 3, above, is reacted with two pound moles of ricinoleic acid until substantially all dibasic carboxyl acidity has disappeared. Time of reaction may vary from a few hours to as much as 20 hours.

Composition of matter, Example 2

Hydroxystearic acid is substituted for ricinoleic acid in the preceding example.

Composition of matter, Example 3

Dihydroxystearic acid is substituted for ricinoleic acid in Composition of matter, Example 1.

Composition of matter, Example 4

Chlorinated ricinoleic acid is substituted for ricinoleic acid in Composition of matter, Example 1.

Composition of matter, Example 5

Brominated ricinoleic acid is substituted for ricinoleic acid in Composition of matter, Example 1.

Composition of matter, Example 6

A mixture of hydroxylated oxidized wax acids having an average molecular weight of approximately 250-275, is substituted for ricinoleic acid in Composition of matter, Example 1.

Composition of matter, Example 7

A mixture of hydroxylated oxidized wax acids having an average molecular weight of approximately 275-300 is substituted for ricinoleic acid in Composition of matter, Example 1.

Composition of matter, Example 8

A mixture of hydroxylated oxidized wax acids having an average molecular weight of approximately 300-325, is substituted for ricinoleic acid in Composition of matter, Example 1.

Composition of matter, Example 9

In Examples 1-8, preceding, any acidity, whether derived from the carboxyl group of the dibasic compounds, or from the carboxyl group of the hydroxy monocarboxy acid, is removed by cautiously adding a dilute solution of ammonium hydroxide until the resultant product gives a clear, limpid solution in water, particularly in dilute form.

Composition of matter, Example 10

In Examples 1-8, preceding, any acidity, whether derived from the carboxyl group of the dibasic compounds, or from the carboxyl group of the hydroxy monocarboxy acid, is removed by cautiously adding a dilute solution of triethanolamine until the resultant product gives a clear, limpid solution in water, particularly in dilute form.

Composition of matter, Example 11

In Examples 1-8, preceding, any acidity, whether derived from the carboxyl group of the dibasic compounds, or from the carboxyl group of the hydroxy monocarboxy acid, is removed by cautiously adding a dilute solution of tris-(hydroxymethyl)aminomethane until the resultant product gives a clear, limpid solution in water, particularly in dilute form.

Composition of matter, Example 12

The same procedure is followed as in Composition of matter, Examples 1-11, inclusive, except that an intermediate product of the kind exemplified by Intermediate product, Example 4, is substituted for that in Intermediate product, Examples 1, 2 and 3.

Composition of matter, Example 13

The same procedure is followed as in Composition of matter, Examples 1-11, inclusive, except that an intermediate product of the kind exemplified by Intermediate product, Example 5, is substituted for that in Intermediate product, Examples 1, 2 and 3.

*Composition of matter, Example 14*

The same procedure is followed as in Composition of matter, Examples 1–11, inclusive, except that an intermediate product of the kind exemplified by Intermediate product, Example 6, is substituted for that in Intermediate product, Examples 1, 2 and 3.

*Composition of matter, Example 15*

The same procedure is followed as in Composition of matter, Examples 1–11, inclusive, except that an intermediate product of the kind exemplified by Intermediate product, Example 7, is substituted for that in Intermediate product, Examples 1, 2 and 3.

It is to be noted that in a reaction of the kind above described, self-esterification takes place. For example, in attempting to esterify ricinoleic acid, probably part of the ricinoleic acid is converted into diricinoleic acid, or possibly even higher polyricinoleic acids. Thus, ricinoleic acid actually may enter into the final compound in the form of a radical derived from diricinoleic acid; and similarly, there may be times that the molecular proportions of the hydroxylated acid must be increased at least slightly, in order to offset this particular reaction. However, such side reaction need not be considered as objectionable; and in the event that substantially all of the dibasic carboxyl acidity is not removed, even so, the compounds obtained show excellent solubility; but in any event, such solubility can be enhanced by neutralization in the manner indicated in Composition of matter, Examples 9, 10 and 11. Peculiarly enough, such products, even where there is considerable residual carboxyl acidity prior to neutralization, still yield compounds which give clear solutions and which show substantial, and in fact, complete resistance to soluble calcium and magnesium salts in the vast majority of cases. It is understood, of course, that the hereto attached claims contemplate products of the kind in which the carboxyl group of ricinoleic acid, for example, is intact and un-neutralized, the preferred form being, of course, the form in which the bulk, if not all, the carboxylic radicals have been removed by neutralization, so as to give a clear, limpid solution in water, as exemplified by Composition of matter, Examples 9, 10 and 11, and subsequent examples of the same type.

It is to be noted that this second step is an esterification reaction, and the same procedure is employed, as suggested above, in the preparation of the intermediate product. Needless to say, any particular method may be used to produce the desired compounds of the kind indicated. In some instances, it may be desirable to conduct the esterification reaction in the presence of a non-volatile inert solvent which simply acts as a diluent or viscosity reducer.

In the preceding examples, attention has been directed primarily to the monomeric form, or at least, to the form in which the bifunctional alcohol, i. e., a glycol, and the polyfunctional acid, usually a bifunctional compound, react to give a chain type compound in which the adjacent acid and glycol nucleus occur as a structural unit. For instance, in the monomeric form this may be indicated in the following manner:

acid . . . glycol . . . acid

If, however, one prepared an intermediate product employing the ratio of three moles of maleic anhydride and two moles of nonaethylene glycol, the tendency would be to produce a product which might be indicated in the following manner:

acid . . glycol . . acid . . glycol . . acid

Similarly, three moles of the glycol and four moles of the acid might tend to give a combination which may be indicated thus:

acid . . glycol . . acid . . glycol
                      . . acid . . glycol . . acid Another way of stating the matter is that the composition may be indicated in the following manner:

$$TOOC.D.COO[(C_2H_4O)_{m-1}C_2H_4OOC.D.COO]_xT$$

in which the characters have their previous significance and $x$ is a relatively small whole number less than 10 and probably less than 5; and in the monomeric form $x$, of course, is 1. The limitations on the size of $x$ are probably influenced largely by the fact that reaction leading to further growth is dependent upon random contact.

Some of the products are self-emulsifiable oils or self-emulsifiable compounds; whereas, others give cloudy solutions or sols; and the most desirable type is characterized by giving a clear solution in water, and usually, in the presence of soluble calcium or magnesium salts, and frequently, in the presence of significant amounts of either acids or alkalies.

Water solubility can be enhanced in a number of ways which have been suggested by previous manufacturing directions, for instance:

(*a*) By using a more highly polymerized ethylene glycol;

(*b*) By using a polymeric form instead of a monomeric form in regard to the unit which forms the chain between the two alcoholic nuclei;

(*c*) By using a polybasic carboxy acid of lower molecular weight, for instance, maleic acid instead of adipic acid;

(*d*) By using an alcoholic material of lower molecular weight, for instance, ricinoleic acid, instead of diricinoleic acid.

In any event, it is to be noted that the compounds of the type herein contemplated are limited to the water-soluble type, i. e., those which are self-emulsifying in water, or produce a sol or a molecular solution.

As has been indicated, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base; for instance, ammonia, triethanolamine, or the like, especially in dilute solution. This procedure has already been described in detail; but even at the expense of repetition, it may be well to point out that precaution should be taken so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

We have found that the particular chemical compounds or reagents herein described and desirable for use as demulsifiers, may also be used for other purposes, for instance, as a break inducer in doctor treatment of the kind intended to sweeten gasoline. See U. S. Patent No. 2,157,223, dated May 9, 1939, to Sutton.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, December 24, 1940, to De Groote and Keiser. As to using compounds of the kind herein described as demulsifiers, or in particular as surface tension depressants in combination with mineral acid or acidization of oil-bearing strata, reference is made to U. S. Patent No. 2,233,383, dated February 25, 1941, to De Groote and Keiser.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance to soluble calcium and magnesium salts, for such property is of particular value. Usually, however, neutralization with a dilute solution of ammonia or the like is just as practicable and less expensive.

The esters herein contemplated are derived from three classes of raw materials, i. e., polyethylene glycols, polybasic carboxylic acids, as described, and high molal water-insoluble hydroxy acids. In the hereto appended claims, the fractional esters derived in turn from two primary reactants, to wit, the polyalkylene glycols and the polybasic carboxylic acids, are referred to as "acidic intermediates," since they possess a free carboxyl radical. The water-insoluble monocarboxy hydroxy acids having at least 11 carbon atoms and not more than 36 carbon atoms, are conveniently referred to in the hereto appended claims as "alcoholic intermediates" insofar as they contain an alcoholiform hydroxyl radical and are employed for reaction with "acidic intermediates." In the hereto attached claims the water-soluble ester referred to is the product resulting from the interaction of the aforementioned alcoholic and acidic intermediates.

Having thus described our invention, what we claim as new and desire to secure by Letters Patent is:

1. A water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; and said primary alcoholic reactant consisting of a polyalkylene glycol having at least 7 and not more than 17 ether linkages; and the alkylene radical thereof containing at least 2 and not more than 6 carbon atoms; and the acidic primary reactant being a polybasic carboxy acid having not more than 6 carbon atoms; and the ratio of the said primary esterifying reactants being within the range of more than 1 mole and not over 2 moles of the polybasic acid for each mole of the polyalkylene glycol; and said intermediate alcoholic reactant being a water-insoluble monocarboxy hydroxy acid having at least 11 carbon atoms and not more than 36 carbon atoms; the ratio of intermediate reactants being two moles of the alcoholic intermediate reactant for each mole of the acidic intermediate reactant.

2. A water-soluble ester, as defined in claim 1, with the added proviso that said ester must be neutral.

3. A water-soluble ester, as defined in claim 1, with the added proviso that said ester must be neutral and that the acidic primary reactant be a dibasic carboxy acid having not more than 6 carbon atoms.

4. A water-soluble ester, as defined in claim 1, with the added proviso that said ester must be neutral; that the acidic primary reactant be a dibasic carboxy acid having not more than 6 carbon atoms; and that the primary alcoholic reactant be a polyethylene glycol having at least 7 and not more than 17 ether linkages.

5. A water-soluble ester, as defined in claim 1, with the added proviso that said ester must be neutral; that the acidic primary reactant be a dibasic carboxy acid having not more than 6 carbon atoms; that the primary alcoholic reactant be a polyethylene glycol having at least 7 and not more than 17 ether linkages; and that the intermediate alcoholic reactant be a water-insoluble monocarboxy hydroxy acid having at least 11 carbon atoms and not more than 18 carbon atoms.

6. A water-soluble ester, as defined in claim 1, with the added proviso that said ester must be neutral; that the acidic primary reactant be a dibasic carboxy acid having not more than 6 carbon atoms; that the primary alcoholic reactant be a polyethylene glycol having at least 7 and not more than 17 ether linkages and that the intermediate alcoholic reactant be ricinoleic acid.

7. A neutral water-soluble chemical compound, as defined in claim 1, and of the following structural formula:

TOOC.D.COO[(C₂H₄O)ₘC₂H₄OOC.D.COO]ₓT in which T is a ricinoleic acid radical; and D is the dibasic acid residue, and $m$ represents a numeral varying from 7 to 12, and $x$ is a small whole number less than 10.

8. A neutral water-soluble chemical compound, as defined in claim 1, and of the following structural formula:

TOOC.D.COO(C₂H₄O)ₘC₂H₄OOC.D.COO.T in which T is a ricinoleic acid radical; and D is the dibasic acid residue, and $m$ represents a numeral varying from 7 to 12.

9. A neutral water-soluble chemical compound, as defined in claim 1, and of the following structural formula:

TOOC.D.COO(C₂H₄O)ₘC₂H₄OOC.D.COO.T in which T is a ricinoleic acid radical; and D is a maleic acid radical, and $m$ represents a numeral varying from 7 to 12.

10. A neutral water-soluble chemical compound, as defined in claim 1, and of the following structural formula:

TOOC.D.COO(C₂H₄O)ₘC₂H₄OOC.D.COO.T in which T is a ricinoleic acid radical; and D is a succinic acid radical, and $m$ represents a numeral varying from 7 to 12.

11. A neutral water-soluble chemical compound, as defined in claim 1, and of the following structural formula:

TOOC.D.COO(C₂H₄O)ₘC₂H₄OOC.D.COO.T in which T is a ricinoleic acid radical; and D is an adipic acid radical, and $m$ represents a numeral varying from 7 to 12.

12. In the method of manufacturing a water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; and said primary alcoholic reactant consisting of a polyalkylene glycol having at least 7 and not more than 17 ether linkages; and the alkylene radical thereof containing at least 2 and not more than 6 carbon atoms; and the acidic primary reactant being a polybasic carboxy acid having not more than 6 carbon atoms; and the ratio of the said primary esterifying reactants being within the range of more than 1 mole and not over 2 moles of the polybasic acid for each mole of the polyalkylene glycol; and said intermediate alcoholic reactant being a water-insoluble monocarboxy hydroxy acid having at least 11 carbon atoms and not more than 36 carbon atoms; the ratio of intermediate reactants being two moles of the alcoholic intermediate reactant for each mole of the acidic intermediate reactant, the steps of: (A) reacting the polyalkylene glycol with the polybasic carboxy acid to yield the acidic intermediate reactant; and (B) esterifying said intermediate acidic reactant with the water-insoluble monocarboxy hydroxy acid to yield the water-soluble ester.

MELVIN DE GROOTE.
BERNHARD KEISER.